(12) United States Patent
Sawada et al.

(10) Patent No.: US 8,106,294 B2
(45) Date of Patent: Jan. 31, 2012

(54) GLASS COMPOSITION FOR DYE-SENSITIZED SOLAR CELL AND MATERIAL FOR DYE-SENSITIZED SOLAR CELL

(75) Inventors: Masahiro Sawada, Otsu (JP); Masaaki Hayashi, Otsu (JP); Kouji Amano, Otsu (JP); Tomoko Yamada, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 12/981,808

(22) Filed: Dec. 30, 2010

(65) Prior Publication Data

US 2011/0094581 A1    Apr. 28, 2011

Related U.S. Application Data

(60) Division of application No. 12/457,173, filed on Jun. 3, 2009, now abandoned, which is a continuation of application No. PCT/JP2009/057519, filed on Apr. 14, 2009.

(30) Foreign Application Priority Data

Apr. 18, 2008    (JP) .................................. 2008-108766

(51) Int. Cl.
*H01L 31/00*    (2006.01)
*C03C 8/02*    (2006.01)
*C03C 8/08*    (2006.01)

(52) U.S. Cl. .......... 136/263; 136/252; 136/258; 501/21; 501/24

(58) Field of Classification Search ................... 136/252, 136/254, 255, 265, 258, 26, 263; 501/15, 501/17, 21, 24, 41, 45, 46; 428/426, 427, 428/428, 432, 630
See application file for complete search history.

(56) References Cited

U.S. PATENT DOCUMENTS 4,342,943 A * 8/1982 Weaver .......................... 313/479
(Continued)

FOREIGN PATENT DOCUMENTS

JP    1-220380    9/1989
(Continued)

OTHER PUBLICATIONS

International Preliminary Report on Patentability issued Dec. 18, 2010, and translation of the Written Opinion of the International Searching Authority in International (PCT) Application No. PCT/JP2009/057519.

(Continued)

*Primary Examiner* — Jerry Lorengo
*Assistant Examiner* — Noah Wiese
(74) *Attorney, Agent, or Firm* — Wenderoth, Lind & Ponack, L.L.P.

(57) ABSTRACT

A dye-sensitized solar cell having high long-term reliability is provided by inventing a glass composition, which is hardly eroded by an iodine electrolyte solution and has a low-melting point property, and a material using the glass composition. The glass composition for a dye-sensitized solar cell of the present invention is characterized by including as a glass composition, in terms of mass %, 20 to 70% of $V_2O_5$ and 10 to 50% of $P_2O_5$.

6 Claims, 1 Drawing Sheet

U.S. PATENT DOCUMENTS

| | | | |
|---|---|---|---|
| 4,741,849 A | 5/1988 | Naito et al. | |
| 4,927,721 A | 5/1990 | Gratzel et al. | |
| 5,076,876 A | 12/1991 | Dieta | |
| 5,084,365 A | 1/1992 | Gratzel et al. | |
| 6,103,648 A | 8/2000 | Yi | |
| 6,849,797 B2 * | 2/2005 | Koyanagi et al. | 136/256 |
| 2006/0003883 A1 * | 1/2006 | Yoshida et al. | 501/46 |
| 2006/0289055 A1 * | 12/2006 | Sridharan et al. | 136/252 |
| 2007/0006917 A1 * | 1/2007 | Gonda et al. | 136/263 |
| 2007/0163645 A1 * | 7/2007 | Gonda et al. | 136/263 |
| 2007/0286973 A1 | 12/2007 | Sawai et al. | |
| 2009/0064717 A1 * | 3/2009 | Son et al. | 65/42 |
| 2009/0136766 A1 | 5/2009 | Son et al. | |

FOREIGN PATENT DOCUMENTS

| | | |
|---|---|---|
| JP | 2002-75472 | 3/2002 |
| JP | 2004-292247 | 10/2004 |
| JP | 2006-342044 | 12/2006 |
| JP | 2007-320822 | 12/2007 |
| JP | 2009-67672 | 4/2009 |
| JP | 2009/126782 | 6/2009 |
| WO | 2005/000755 | 1/2005 |
| WO | 2009/128451 | 10/2009 |

OTHER PUBLICATIONS

International Search Report issued Jul. 14, 2009 in International (PCT) Application No. PCT/JP2009/057519.

* cited by examiner

US 8,106,294 B2

GLASS COMPOSITION FOR DYE-SENSITIZED SOLAR CELL AND MATERIAL FOR DYE-SENSITIZED SOLAR CELL

CROSS-REFERENCE TO RELATED APPLICATION

This application is a Divisional of U.S. application Ser. No. 12/457,173, filed Jun. 3, 2009 now abandoned, which is a continuation application of international application PCT/JP2009/057519 filed Apr. 14, 2009, and claiming the priority of Japanese application 2008-108766 filed Apr. 18, 2008.

TECHNICAL FIELD

The present invention relates to a glass composition for a dye-sensitized solar cell and a material for a dye-sensitized solar cell, and more specifically to a glass composition for a dye-sensitized solar cell and a material for a dye-sensitized solar cell which are suitable for sealing a transparent electrode substrate and a counter electrode substrate of a dye-sensitized solar cell, forming a partition wall for dividing cells, and overcoating a collector electrode.

BACKGROUND ART

The dye-sensitized solar cell which was developed by Gratzel et al. is low in cost compared with solar cells each using a silicon semiconductor, and there are abundant raw materials needed for the production of the dye-sensitized solar cell, and hence, the dye-sensitized solar cell is expected as a next-generation solar cell.

The dye-sensitized solar cell includes: a transparent electrode substrate having a transparent conductive film; a porous oxide semiconductor electrode including a porous oxide semiconductor layer (mainly a $TiO_2$ layer), which is formed on the transparent electrode substrate; a dye such as a Ru-dye, which is adsorbed to the porous oxide semiconductor electrode; an iodine electrolyte solution containing iodine; a counter electrode substrate on which a catalyst film and a transparent conductive film are formed; and the like.

There are used a glass substrate, a plastic substrate, and the like for the transparent electrode substrate and the counter electrode substrate. When the plastic substrate is used for the transparent electrode substrate, the resistivity of a transparent electrode film becomes large and the photoelectric conversion efficiency of the dye-sensitized solar cell lowers. On the other hand, when the glass substrate is used for the transparent electrode substrate, the resistivity of the transparent electrode film hardly increases, and hence, the photoelectric conversion efficiency of the dye-sensitized solar cell can be maintained. Therefore, in recent years, the glass substrate has been used as the transparent electrode substrate.

In the dye-sensitized solar cell, the iodine electrolyte solution is filled between the transparent electrode substrate and the counter electrode substrate. In order to prevent the leakage of the iodine electrolyte solution from the dye-sensitized solar cell, the peripheries of the transparent electrode substrate and the counter electrode substrate need to be sealed. Further, in order to effectively extract the generated electrons, a collector electrode (e.g., Ag or the like is used therefor) may be formed on the transparent electrode substrate. In this case, there is a need to overcoat the collector electrode and prevent a situation that the collector electrode is eroded by the iodine electrolyte solution. In addition, in the case of forming a cell circuit on one sheet of glass substrate, a partition wall may be formed between the transparent electrode substrate and the counter electrode substrate.

PRIOR ART DOCUMENTS

Patent Document 1: JP 1-220380 A
Patent Document 2: JP 2002-75472 A
Patent Document 3: JP 2004-292247 A

SUMMARY OF THE INVENTION

Problems to be Solved by the Invention

In a dye-sensitized solar cell, it is the improvement in long-term durability that is an object for practical application. One of the reasons for which the long-term durability is impaired is, for example, as follows. Solar cell members (sealing material, collector electrode, and the like) react with an iodine electrolyte solution, and the solar cell members and the iodine electrolyte solution are degraded. In particular, the tendency is remarkable when a resin is used for the sealing material and an organic solvent such as acetonitrile is used for the iodine electrolyte solution. In this case, the resin is eroded by the iodine electrolyte solution, and hence, the iodine electrolyte solution is leaked from the solar cell, whereby cell performances remarkably deteriorate. In the case where a resin is used for forming a partition wall or for coating a collector electrode in the similar way, the resin is also eroded by the iodine electrolyte solution, and hence, there occurs deterioration of the collector electrode, tearing of the partition wall, or the like.

In view of the above circumstances, there are proposed methods in which a resin is not used for a sealing material. For example, in Patent Document 1, it is described that the peripheries of a transparent electrode substrate and a counter electrode substrate are sealed using glass. Further, in each of Patent Documents 2 and 3, it is described that the peripheries of a transparent electrode substrate and a counter electrode substrate are sealed using a lead glass.

However, even in the case where the lead glass is used for the sealing material, a component of the lead glass is eluted into an iodine electrolyte solution due to long-term use, because the lead glass is easily eroded by the iodine electrolyte solution. As a result, the iodine electrolyte solution is degraded, and the cell performances deteriorate. Further, even in the case where the lead glass is used for overcoating a collector electrode or for forming a partition wall, there occurs deterioration of the collector electrode or tearing of the partition wall due to long-term use. Those phenomena are also caused by the erosion of the lead glass by the iodine electrolyte solution.

Further, when the softening point of the sealing material is higher than the strain point of a glass substrate, the glass substrate is deformed during a sealing process. Therefore, it is required that the sealing material (glass to be used for the sealing material) have a low-melting point property, e.g., a softening point of preferably 550° C. or lower or more preferably 500° C. or lower.

Accordingly, the present invention has a technical object to provide a dye-sensitized solar cell having high long-term reliability, by inventing a glass composition, which is hardly eroded by an iodine electrolyte solution and has a low-melting point property, and a material using the glass composition.

Means for Solving the Problems

The inventors of the present invention have conducted various studies and as a result, they have found that the above technical object can be solved by introducing $V_2O_5$ and $P_2O_5$ as essential components into a glass composition, and have proposed the finding as the present invention. That is, a glass composition for a dye-sensitized solar cell of the present invention is characterized by including as a glass composition, in terms of mass %, 20 to 70% of $V_2O_5$ and 10 to 50% of $P_2O_5$. It should be noted that the mechanism in which it becomes less likely that a glass is eroded by the iodine electrolyte solution when $V_2O_5$ and $P_2O_5$ are introduced into the glass composition is not clear at the present time, and is currently under intensive investigation.

When the content of $V_2O_5$ is regulated to 20 to 70%, it becomes less likely that the glass is eroded by the iodine electrolyte solution while the thermal stability of the glass is improved, and in addition, the melting point of the glass can be lowered.

When the content of $P_2O_5$ is regulated to 10 to 50%, it becomes less likely that the glass is eroded by the iodine electrolyte solution while the thermal stability of the glass is improved, and in addition, the melting point of the glass can be lowered.

Second, the glass composition for a dye-sensitized solar cell of the present invention is characterized by further including as a glass composition, in terms of mass %, 10 to 55% of ZnO+SrO+BaO+CuO (a total amount of ZnO, SrO, BaO, and/or CuO).

Third, the glass composition for a dye-sensitized solar cell of the present invention is characterized by including as a glass composition, in terms of mass %, 0 to 30% of ZnO, 0 to 20% of SrO, 0 to 45% of BaO, and 0 to 15% of CuO.

Fourth, the glass composition for a dye-sensitized solar cell of the present invention is characterized by having a mass reduction of 0.1 mg/cm$^2$ or less after being immersed in an iodine electrolyte solution at 25° C. for 2 weeks. Here, as the iodine electrolyte solution used for calculating the mass reduction, there is used a solution in which 0.1 M lithium iodide, 0.05 M iodine, 0.5 M tert-butylpyridine, and 0.6 M 1,2-dimethyl-3-propyl imidazolium iodide are dissolved in acetonitrile. Further, "mass reduction" is calculated by: immersing a glass substrate on which glass powder formed of the glass composition is densely baked (glass substrate having a baked film) in the iodine electrolyte solution inside a closed container; and dividing a value obtained by subtracting a mass after the elapse of 2 weeks from a mass before the immersion by an area of the baked film which is in contact with the iodine electrolyte solution. It should be noted that a glass substrate which is not eroded by the iodine electrolyte solution is used as the glass substrate.

In general, the iodine electrolyte solution refers to a solution in which iodine compounds such as iodine, an alkali metal iodide, an imidazolium iodide, or a quaternary ammonium salt is dissolved in an organic solvent, but also refers to a solution in which compounds other than the iodine compound are also dissolved, such as tert-butylpyridine and 1-methoxybenzoimidazole. As the solvent, there is used a nitrile-based solvent such as acetonitrile, methoxyacetonitrile, or propionitrile; a carbonate-based solvent such as ethylene carbonate or propylene carbonate; a lactone-based solvent; or the like. Regarding the iodine electrolyte solutions composed of those compounds and solvents, however, the above-mentioned problem that the glass is eroded by the iodine electrolyte solution may occur. Therefore, it is preferred that the glass composition for a dye-sensitized solar cell of the present invention have a mass reduction of 0.1 mg/cm$^2$ or less after being immersed in any one of those iodine electrolyte solutions at 25° C. for 2 weeks.

Fifth, the glass composition for a dye-sensitized solar cell of the present invention is characterized by having a thermal expansion coefficient of 65 to 120×10$^{-7}$/° C. Here, the "thermal expansion coefficient" refers to a value measured by a push-rod type thermal expansion coefficient measuring apparatus (TMA) in a temperature range of 30 to 300° C.

Sixth, a material for a dye-sensitized solar cell of the present invention is characterized by including 50 to 100 vol % of a glass powder formed of the glass composition for a dye-sensitized solar cell and 0 to 50 vol % of a refractory filler powder. It should be noted that the material for a dye-sensitized solar cell of the present invention includes an aspect in which the material is formed only of the glass powder formed of the glass composition. Further, in the material for a dye-sensitized solar cell of the present invention, the content of the refractory filler powder is, from the viewpoint of fluidity, preferably 10 vol % or less or 5 vol % or less, and particularly preferably 1 vol % or less, and it is more preferred that the material be substantially free of the refractory filler powder (to be specific, the content of the refractory filler powder is 0.5 vol % or less). Particularly in the case where the material is used for the sealing, the gap between the transparent electrode substrate and the counter electrode substrate can be easily made small and uniform when the content of the refractory filler powder is reduced.

Seventh, the material for a dye-sensitized solar cell of the present invention is characterized by having a softening point of 550° C. or lower. Here, the "softening point" refers to a value measured by a macro-type differential thermal analysis (DTA) apparatus. DTA initiates measurement from room temperature and has a rate of temperature rise of 10° C./min. It should be noted that the softening point measured by the macro-type DTA apparatus is represented by a temperature (Ts) at the fourth inflection point illustrated in FIG. 1.

Eighth, the material for a dye-sensitized solar cell of the present invention is characterized by being used for sealing. Here, the sealing includes sealing of a glass tube or the like in addition to sealing of the transparent electrode substrate and the counter electrode substrate. It should be noted that there is a case where multiple openings are provided on the transparent electrode substrate, the counter electrode substrate, and the like, and glass tubes are sealed to the respective multiple openings, and after that, a liquid containing a pigment or the like is circulated inside the dye-sensitized solar cell via the glass tubes, whereby the pigment is adsorbed to a porous oxide semiconductor. In this case, it becomes less likely that the leakage of the liquid or the like, etc. occur when the glass tubes are sealed using the material for a dye-sensitized solar cell of the present invention.

Ninth, the material for a dye-sensitized solar cell of the present invention is characterized by being used for sealing by a laser beam.

Tenth, the material for a dye-sensitized solar cell of the present invention is characterized by being used for overcoating a collector electrode.

Effects of the Invention

In the glass composition for a dye-sensitized solar cell of the present invention, when $V_2O_5$ and $P_2O_5$ are introduced as essential components into a glass composition, the erosion by the iodine electrolyte solution hardly occurs, and the mass reduction of the glass composition for a dye-sensitized solar cell after being immersed in the iodine electrolyte solution at 25° C. for 2 weeks can be set to 0.1 mg/cm$^2$ or less. As a result, a sealed part, a partition wall, and a overcoated part are hardly eroded by the iodine electrolyte solution, and the degradation of the iodine electrolyte solution or the cell performances can be prevented for a long period of time.

BEST MODE FOR CARRYING OUT THE INVENTION

In a glass composition for a dye-sensitized solar cell of the present invention, the reason for limiting the range of a glass composition to the above range is described below. It should be noted that, unless otherwise mentioned, "%" used below means "mass %".

$V_2O_5$ is, as well as being a glass-forming oxide, a component which makes it less likely that the erosion by the iodine electrolyte solution occurs, and is also a component which lowers the melting point of glass. The content thereof is 20 to 70%, more preferably 30 to 60%, and still more preferably 45 to 55%. When the content of $V_2O_5$ is less than 20%, the viscosity of the glass becomes high and the baking temperature becomes high. Further, when the content of $V_2O_5$ is set to 45% or more, the fluidity of the glass improves, and a high airtightness can be obtained. On the other hand, when the content of $V_2O_5$ is more than 70%, the glass composition may be vitrified, but the devitrification resistance of the glass is easily lowered. Further, when the content of $V_2O_5$ is more than 70%, the glass becomes easily foamed at the time of baking. Further, when the content of $V_2O_5$ is 55% or less, the devitrification resistance can be improved and the thermal stability of the glass improves.

$P_2O_5$ is, as well as being a glass-forming oxide, a component which makes it less likely that the erosion by the iodine electrolyte solution occurs, and is also a component which lowers the melting point of the glass. The content thereof is 10 to 50%, more preferably 15 to 35%, and still more preferably 20 to 30%. When the content of $P_2O_5$ is less than 10%, the thermal stability of the glass is easily lowered. On the other hand, when the content of $P_2O_5$ is more than 60%, the moisture resistance of the glass is easily deteriorated.

The glass composition for a dye-sensitized solar cell of the present invention can contain, apart from the above components, the following components in a glass composition.

ZnO+SrO+BaO+CuO is a network-modifier oxide which stabilizes the glass. The content thereof is 10 to 55% and more preferably 14 to 30%. When the content of ZnO+SrO+BaO+CuO is less than 10%, the effect of stabilizing the glass is poor, and when the content of ZnO+SrO+BaO+CuO is more than 55%, the balance between the components of the glass composition is disturbed, and the other way around, the glass becomes unstable and is easily devitrified at the time of forming a molten glass into the glass.

ZnO is a component which stabilizes the glass. On the other hand, ZnO has a tendency of promoting the erosion of the glass by the iodine electrolyte solution. Therefore, the content thereof is 0 to 30%, more preferably 0 to 20%, still more preferably 0 to 15%, and particularly preferably 0 to 10%. When the content of ZnO is more than 30%, the devitrification resistance of the glass is easily lowered.

SrO is, as well as being a component which improves the thermal stability of the glass and suppresses the devitrification of the glass, a component which lowers the viscosity of the glass. The content thereof is 0 to 20% and preferably 0 to 15%. When the content of SrO is more than 20%, the balance between the components of the glass composition is disturbed, and the other way around, the thermal stability of the glass is easily lowered.

BaO is, as well as being a component which improves the thermal stability of the glass and suppresses the devitrification of the glass, a component which lowers the viscosity of the glass. The content thereof is 0 to 45% and more preferably 3 to 22%. When the content of BaO is more than 45%, the balance between the components of the glass composition is disturbed, and the other way around, the thermal stability of the glass is easily lowered.

CuO is, as well as being a component which improves the thermal stability of the glass and suppresses the devitrification of the glass, a component which improves the weatherability of the glass. The content thereof is 0 to 15% and preferably 0 to 10%. When the content of CuO is more than 15%, the viscosity of the glass becomes too high, and the sealing temperature is easily increased.

Further, in the glass composition for a dye-sensitized solar cell of the present invention, there can be introduced into a glass composition, in addition to the above components, up to 20% of CaO, MgO, $TeO_2$, $B_2O_3$, $Fe_2O_3$, $Al_2O_3$, $SiO_2$, and the like. It should be noted that, from the environmental viewpoint and the viewpoint of preventing the erosion by an iodine electrolyte solution, it is preferred that the glass composition for a dye-sensitized solar cell of the present invention be substantially free of PbO. Here, the phrase "be substantially free of PbO" refers to the case where the content of PbO in the glass composition is 1,000 ppm or less.

In the glass composition for a dye-sensitized solar cell of the present invention, the mass reduction after being immersed in an iodine electrolyte solution at 25° C. for 2 weeks is 0.1 mg/cm$^2$ or less and preferably 0.05 mg/cm$^2$ or less, and it is still more preferred that there be substantially no mass reduction. When the mass reduction is 0.1 mg/cm$^2$ or less, the degradation of the iodine electrolyte solution or the cell performances can be prevented for a long period of time. Here, "be substantially no mass reduction" refers to the case where the mass reduction is 0.01 mg/cm$^2$ or less.

In the glass composition for a dye-sensitized solar cell of the present invention, the thermal expansion coefficient is preferably 65 to 120×10$^{-7}$/° C. and more preferably 80 to 110×10$^{-7}$/° C. When the difference between the thermal expansion coefficient of the glass composition for a dye-sensitized solar cell of the present invention and the thermal expansion coefficient of a glass substrate (e.g., soda glass substrate) used for the transparent electrode substrate or the like is too large, there remains, unless a refractory filler powder is added thereto, undue stress on the glass substrate, a sealed part, or the like after baking, and hence, it becomes more likely that a crack is generated on the glass substrate, the sealed part, or the like, or peeling occurs at the sealed part.

The material for a dye-sensitized solar cell of the present invention is preferably formed only of a glass powder formed of the glass composition for a dye-sensitized solar cell. In such a manner, the cell gap of the solar cell can be easily made small and uniform, and also, a mixing process or the like of the refractory filler powder, etc. becomes unnecessary. Therefore, the production cost of the material for a dye-sensitized solar cell can be reduced.

The material for a dye-sensitized solar cell of the present invention may contain a refractory filler powder in order to improve the mechanical strength or to decrease the thermal expansion coefficient. On the other hand, if the addition amount of the refractory filler powder is decreased, the fluidity, or in particular, the sealing property, of the material for a dye-sensitized solar cell can be enhanced. Accordingly, the mixing ratio is 50 to 100 vol % of the glass powder to 0 to 50 vol % of the refractory filler powder, preferably 65 to 100 vol % of the glass powder to 0 to 35 vol % of the refractory filler powder, and more preferably 95 to 100 vol % of the glass powder to 0 to 5 vol % of the refractory filler powder, and it is desired that, from the reasons stated above, the material be substantially free of the refractory filler powder. When the content of the refractory filler powder is more than 50 vol %, the ratio of the glass powder relatively becomes too low, and hence, it becomes difficult to obtain the desired fluidity.

In general, the cell gap of the dye-sensitized solar cell is 50 μm or less, which is extremely small. Therefore, when the particle size of the refractory filler powder is too large, a protrusion is generated locally at the sealed part, and hence, it becomes difficult to make the cell gap uniform. In order to prevent such situation, the maximum particle size of the refractory filler powder is preferably 25 μm or less and more preferably 15 μm or less. Here, the "maximum particle size" refers to the particle size of a particle in which, in a cumulative particle size distribution curve on a volumetric basis when measured by a laser diffraction method, the integrated quantity thereof is 99% when accumulated in the order starting from the particle having the smallest particle size.

The material of the refractory filler powder is not particularly limited, and is preferably a material which hardly reacts with the glass powder formed of the glass composition for a dye-sensitized solar cell of the present invention and the iodine electrolyte solution. Specifically, as the refractory filler powder, there can be used zircon, zirconia, tin oxide, aluminum titanate, quartz, β-spodumene, mullite, titania, quartz glass, β-eucryptite, β-quartz, zirconium phosphate, zirconium phosphotungstate, zirconium tungstate, willemite, a compound having $[AB_2(MO_4)_3]$ as a basic structure where A represents Li, Na, K, Mg, Ca, Sr, Ba, Zn, Cu, Ni, Mn, or the like, B represents Zr, Ti, Sn, Nb, Al, Sc, Y, or the like, and M represents P, Si, W, Mo, or the like, and a solid solution thereof.

In the material for a dye-sensitized solar cell of the present invention, the softening point is preferably 550° C. or lower and more preferably 500° C. or lower. When the softening point is higher than 500° C., the viscosity of the glass becomes too high and the sealing temperature is unduly increased, and hence, the glass substrate is easily deformed. Further, in the case where the material for a dye-sensitized solar cell and a porous oxide semiconductor layer are baked simultaneously, the fusion of oxide semiconductor particles may proceed too much when the sealing temperature is too high. In such a case, the surface area of the porous oxide semiconductor layer decreases, which makes it less likely that a pigment is adsorbed thereto.

In the material for a dye-sensitized solar cell of the present invention, the mass reduction after being immersed in an iodine electrolyte solution at 25° C. for 2 weeks is 0.1 mg/cm$^2$ or less and preferably 0.05 mg/cm$^2$ or less, and it is desired that there be substantially no mass reduction. When the mass reduction is 0.1 mg/cm$^2$ or less, the deterioration of the iodine electrolyte solution or the cell performances can be prevented for a long period of time.

The material for a dye-sensitized solar cell of the present invention in a powder form may be used as it is, and when the material is kneaded homogeneously with a vehicle and processed into a paste, it becomes easier to handle. The vehicle is mainly composed of a solvent and a resin, and the resin is added thereto for adjusting the viscosity of the paste. Further, a surfactant, a thickener, or the like may also be added thereto, if required. The produced paste is subjected to coating by using a coating machine such as a dispenser or a screen printing machine.

As the resin, there can be used an acrylate (acrylic resin), ethylcellulose, a polyethylene glycol derivative, nitrocellulose, polymethylstyrene, polyethylene carbonate, a methacrylate, and the like. In particular, an acrylate and nitrocellulose are preferred because of having good thermolytic property.

As the solvent, N,N'-dimethyl formamide (DMF), there can be used α-terpineol, a higher alcohol, γ-butyrolactone (γ-BL), tetralin, butylcarbitol acetate, ethyl acetate, isoamyl acetate, diethylene glycolmonoethyl ether, diethylene glycolmonoethyl ether acetate, benzyl alcohol, toluene, 3-methoxy-3-methylbutanol, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpineol is preferred because of having high viscosity and good solubility of a resin and the like.

The material for a dye-sensitized solar cell of the present invention is preferably used for a sealing purpose, and particularly preferably used for sealing a transparent electrode substrate and a counter electrode substrate. The material for a dye-sensitized solar cell of the present invention has low-melting point property and is hardly eroded by the iodine electrolyte solution, and hence, the iodine electrolyte solution hardly leaks during long-term use and the prolonged lifetime of the solar cell can be expected. Further, in the case where the material is used for sealing the transparent electrode substrate and the counter electrode substrate, a spacer such as a glass bead may be added to the material for a dye-sensitized solar cell of the present invention in order to make the cell gap of the solar cell uniform.

The material for a dye-sensitized solar cell of the present invention contains 20% or more of $V_2O_5$ in a glass composition, and hence, the material can be subjected to a sealing treatment by a laser beam. When the laser beam is used, the material for a dye-sensitized solar cell can be locally heated. Therefore, the transparent electrode substrate and the counter electrode substrate can be sealed while preventing the heat deterioration of a constituent member such as the iodine electrolyte solution. In the case where the transparent electrode substrate and the counter electrode substrate are sealed by using the laser beam, the material for a dye-sensitized solar cell of the present invention contains preferably 30% or more or 40% or more, or particularly preferably 45% or more of $V_2O_5$ in a glass composition. When the content of $V_2O_5$ is thus regulated, light energy of the laser beam can be effectively converted into heat energy, in other words, the laser beam can be absorbed to the glass accurately, and hence, only the parts to be sealed can be locally heated accurately. On the other hand, when the content of $V_2O_5$ is regulated to 70% or less, and particularly to 60% or less, a situation that the glass is devitrified at the time of irradiating the laser beam can be prevented. Here, various laser beams can be used as the laser beam, and in particular, a semiconductor laser, a YAG laser, a $CO_2$ laser, an excimer laser, an infrared laser, and the like are suitable, because they are easy to handle. Further, in order to allow the glass to absorb the laser beam accurately, the laser beam preferably has an emission center wavelength of 500 to 1,600 nm and preferably 750 to 1,300 nm.

The material for a dye-sensitized solar cell of the present invention is preferably used for overcoating a collector electrode. In general, there is used Ag for the collector electrode, but Ag is easily eroded by the iodine electrolyte solution. Accordingly, in the case where Ag is used for the collector electrode, the collector electrode needs to be protected. The material for a dye-sensitized solar cell of the present invention has low-melting point property, and hence, a dense coating layer can be formed at low temperature. In addition, the material is hardly eroded by the iodine electrolyte solution, and hence can protect the collector electrode for a long period of time.

The material for a dye-sensitized solar cell of the present invention can be used for forming a partition wall. In general, in the case where the partition wall is formed in the dye-sensitized solar cell, inside the cell is filled with the iodine electrolyte solution. The material for a dye-sensitized solar cell of the present invention has low-melting point property, and hence, a dense partition wall can be formed at low temperature. In addition, the material is hardly eroded by the iodine electrolyte solution, and hence can prevent tearing of the partition wall for a long period of time.

EXAMPLES

The present invention is described in detail based on examples. Table 1 shows Examples (Sample Nos. 1 to 5) and Comparative Examples (Sample No. 6) of the present invention.

mal expansion coefficient: $100 \times 10^{-7}/°$ C.) so as to have a diameter of 40 mm and a thickness of 40 to 80 μm, followed by drying at 120° C. for 10 minutes and then baking at 500° C. for 30 minutes in an electric furnace, whereby a sample for evaluating mass reduction was obtained.

The above samples were used, and the thermal expansion coefficient, the softening point, and the mass reduction with respect to an iodine electrolyte solution were evaluated. The results are shown in Table 1.

The thermal expansion coefficient was measured by a TMA measuring apparatus. The thermal expansion coefficient was measured at a temperature range of 30 to 300° C. It should be noted that Sample No. 6 was processed to have a predetermined shape by densely sintering the mixed powder, and then was used as a measurement sample.

The softening point was determined by a DTA apparatus. The measurement was performed in air and the rate of temperature rise was set to 10° C./min.

The mass reduction was calculated as follows. First, the mass of the sample for evaluating mass reduction and the

TABLE 1

|  |  | Example | | | | | Comparative Example |
|---|---|---|---|---|---|---|---|
|  |  | 1 | 2 | 3 | 4 | 5 | 6 |
| Glass composition (mass %) | $V_2O_5$ | 50.0 | 46.0 | 47.5 | 55.0 | 50.0 | — |
|  | $P_2O_5$ | 25.0 | 29.0 | 25.0 | 28.0 | 25.0 | — |
|  | ZnO | 7.5 | 12.5 | — | 2.0 | 7.5 | — |
|  | BaO | 14.0 | 12.5 | 20.0 | 14.0 | 3.0 | |
|  | SrO | 3.5 | — | — | 1.0 | 14.5 | — |
|  | CuO | — | — | 7.5 | — | — | — |
|  | PbO | — | — | — | — | — | 85.3 |
|  | $B_2O_3$ | — | — | — | — | — | 12.7 |
|  | $SiO_2$ | — | — | — | — | — | 1.0 |
|  | $Al_2O_3$ | — | — | — | — | — | 1.0 |
| Refractory filler powder (vol %) |  | Absent | Absent | Absent | Absent | Absent | $PbTiO_3$ 37 |
| Thermal expansion coefficient ($10^{-7}/°$ C.) |  | 93 | 86 | 98 | 99 | 94 | 73 |
| Softening point (° C.) |  | 420 | 437 | 449 | 438 | 431 | 390 |
| Mass reduction (mg/cm²) |  | 0.00 | 0.00 | 0.00 | 0.00 | 0.00 | 0.32 |

Each of the samples described in the table was prepared as follows. First, a glass batch in which raw materials such as various oxides and carbonates were mixed so as to have a glass composition shown in the table was prepared, and was then loaded into a platinum crucible and melted at 1,000 to 1,200° C. for 1 to 2 hours. Next, a part of the molten glass, which serves as a sample for measuring a thermal expansion coefficient, was poured into a die made of stainless steel, and the remaining molten glass was formed into a flaky shape by a water cooled roller. The sample for measuring a thermal expansion coefficient was subjected to a predetermined annealing treatment. Finally, the flaky glass was pulverized by a ball mill and then allowed to pass through a sieve having a mesh of 75 μm, whereby each glass powder having an average particle size of about 10 μm was obtained. It should be noted that Sample No. 6 is a sample which is obtained by adding the refractory filler powder (lead titanate, average particle size of 10 μm) shown in the table to the glass composition at the ratio shown in the table and mixing the resultant.

Next, each glass powder (mixed powder in the case of Sample No. 6) and a vehicle (which was obtained by dissolving ethylcellulose in α-terpineol) were kneaded into a paste. The paste was screen printed on a soda glass substrate (thersurface area of the baked film which is in contact with the iodine electrolyte solution were measured. Next, the sample was immersed in the iodine electrolyte solution inside a closed container made of glass, and then the closed container made of glass was left standing still in a thermostat at 25° C. The mass reduction was calculated by dividing a value obtained by subtracting the mass of the sample after the elapse of 2 weeks from the mass of the sample before the immersion by the surface area of the baked film. As the iodine electrolyte solution used for the evaluation of the mass reduction, there was used a solution in which 0.1 M lithium iodide, 0.05 M iodine, 0.5 M tert-butylpyridine, and 0.6 M 1,2-dimethyl-3-propyl imidazolium iodide were added to acetonitrile.

As is clear from Table 1, Sample Nos. 1 to 5 each had a thermal expansion coefficient of 86 to $99 \times 10^{-7}/°$ C. and a softening point of 420 to 449° C. Further, in each sample for measuring mass reduction, the baked film satisfactorily adhered to the glass substrate without causing peeling. In addition, the mass reduction could not be confirmed in each of Sample Nos. 1 to 5, so Sample Nos. 1 to 5 were hardly eroded by the iodine electrolyte solution. On the other hand, Sample No. 6 had a mass reduction of 0.32 mg/cm², because Sample No. 6 used lead glass, so Sample No. 6 was eroded by the iodine electrolyte solution.

INDUSTRIAL APPLICABILITY

The glass composition for a dye-sensitized solar cell and the material for a dye-sensitized solar cell of the present invention are suitable for sealing the transparent electrode substrate and the counter electrode substrate of a dye-sensitized solar cell, forming the partition wall for dividing cells, and overcoating the collector electrode.

BRIEF DESCRIPTION OF THE DRAWING

FIG. 1 is a schematic diagram illustrating a softening point of glass measured by a macro-type DTA apparatus.

The invention claimed is:

1. A dye-sensitized solar cell comprising:
   a transparent electrode substrate having a transparent conductive film;
   a porous oxide semiconductor electrode formed on the transparent electrode substrate;
   a dye adsorbed to the porous oxide semiconductor electrode;
   a counter electrode substrate on which a catalyst film and a transparent conductive film are formed;
   a sealing material sealing peripheries of the transparent electrode substrate and the counter electrode substrate; and
   an iodine electrolyte solution filled between the transparent electrode substrate and the counter electrode substrate,
   wherein the sealing material includes a glass composition, the glass composition comprising, in terms of mass %, 45 to 70% of $V_2O_5$, 10 to 50% of $P_2O_5$, and 0 to 22% of BaO, and having a mass reduction of 0.1 mg/cm$^2$ or less after being immersed in an iodine electrolyte solution at 25° C. for 2 weeks.

2. A dye-sensitized solar cell according to claim 1, wherein the glass composition further comprises, in terms of mass %, 10 to 55% of ZnO+SrO+BaO+CuO.

3. A dye-sensitized solar cell according to claim 2, wherein the glass composition comprises, in terms of mass %, 0 to 30% of ZnO, 0 to 20% of SrO, and 0 to 15% of CuO.

4. A dye-sensitized solar cell according to claim 1, wherein the glass composition has a thermal expansion coefficient of $65 \times 10^{-7}/°C.$ to $120 \times 10^{-7}/°C.$ 5. A dye-sensitized solar cell according to any one of claims 1-4, wherein the sealing material comprises 50 to 100 vol % of a glass powder formed of the glass composition, and 0 to 50 vol % of a refractory filler powder.

6. A dye-sensitized solar cell according to claim 5, wherein the sealing material has a softening point of 550° C. or lower.

* * * * *